Aug. 17, 1965      W. A. WILLIAMS      3,200,660
VARIABLE PITCH SHEAVES HAVING A LARGE NUMBER OF GROOVES
Original Filed March 7, 1961      2 Sheets-Sheet 1
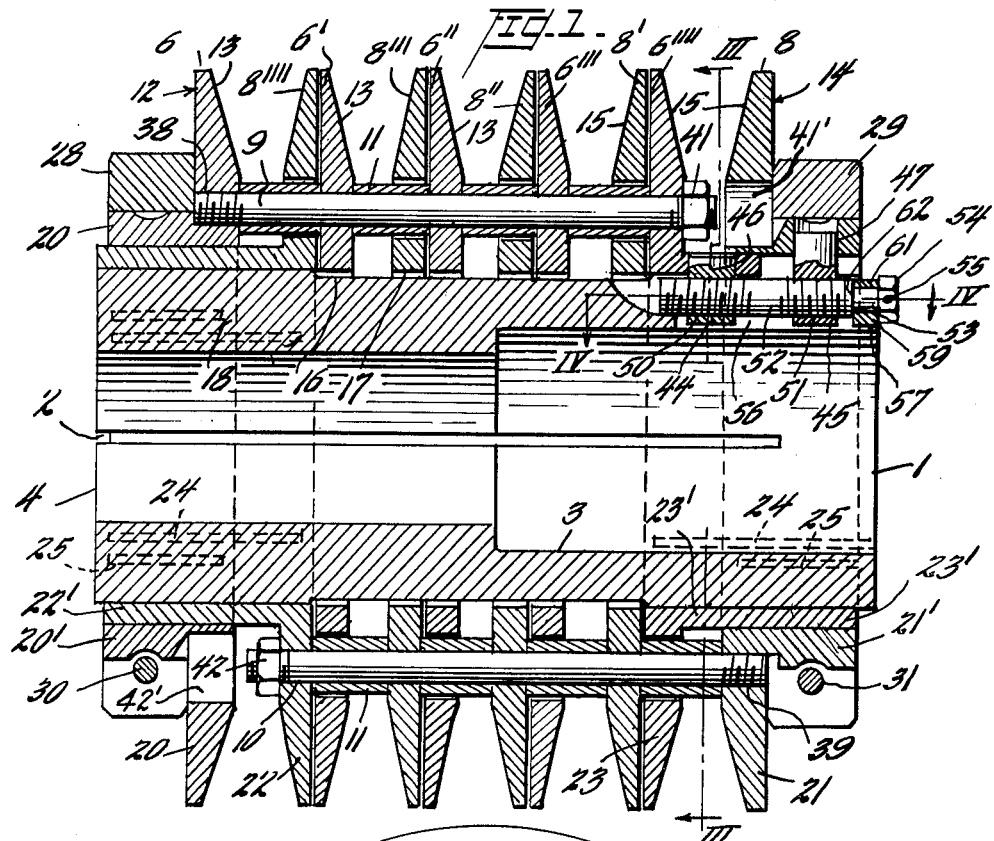
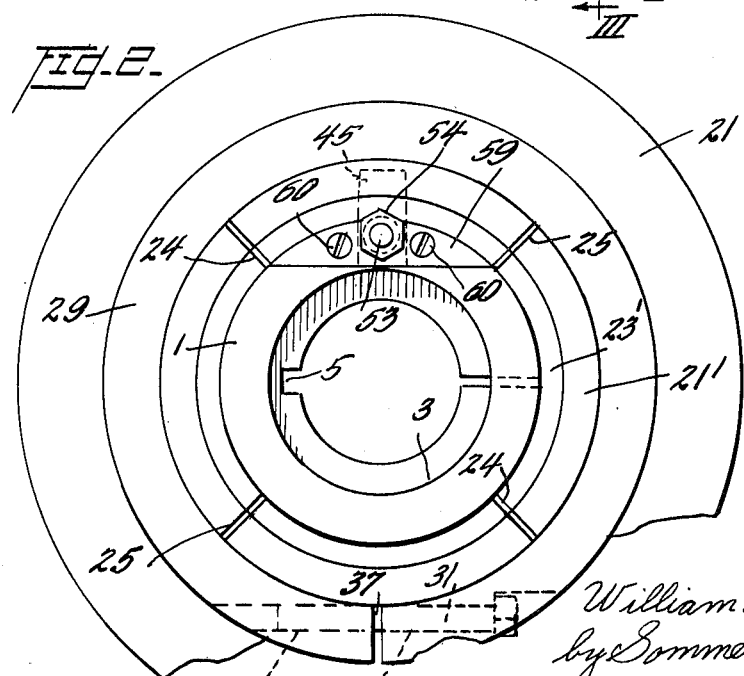
INVENTOR
William A. Williams
by Sommers & Young
ATTORNEYS Aug. 17, 1965     W. A. WILLIAMS     3,200,660
VARIABLE PITCH SHEAVES HAVING A LARGE NUMBER OF GROOVES
Original Filed March 7, 1961     2 Sheets-Sheet 2
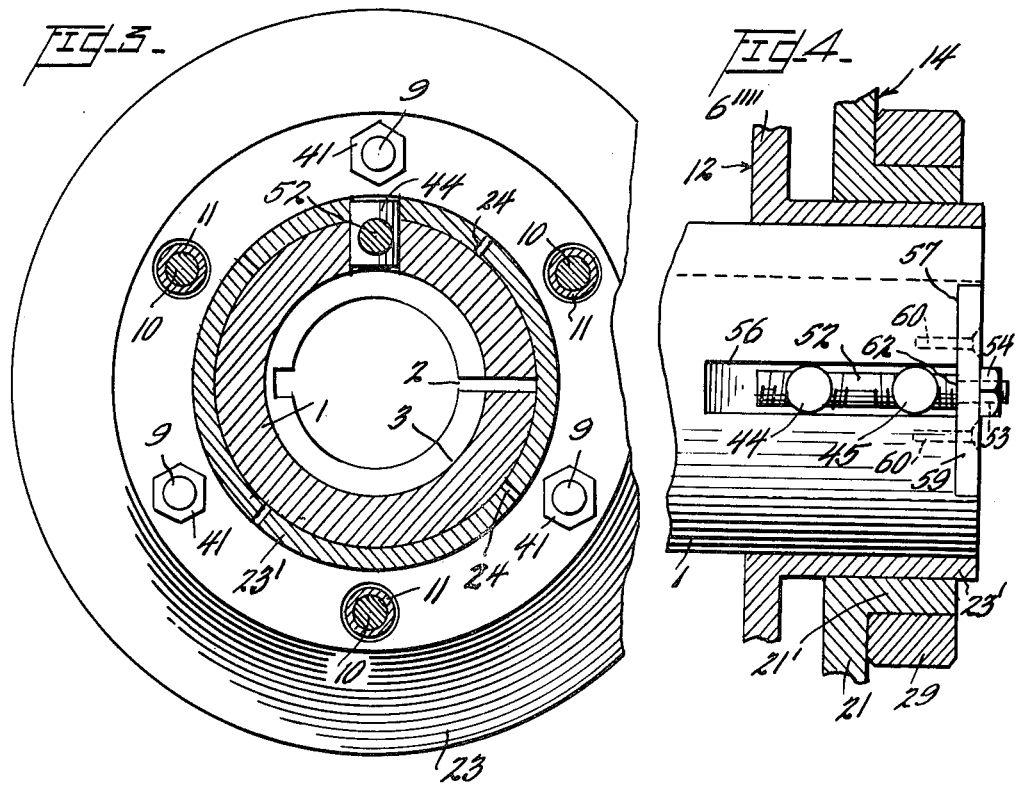
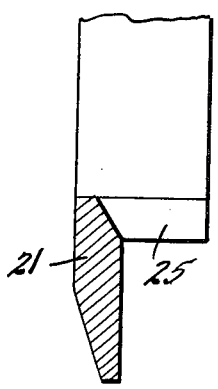
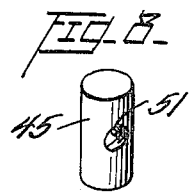
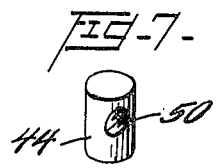
INVENTOR
William A. Williams
BY Sommers & Young
ATTORNEYS

United States Patent Office

3,200,660
Patented Aug. 17, 1965

3,200,660
VARIABLE PITCH SHEAVES HAVING A LARGE NUMBER OF GROOVES
William A. Williams, Philadelphia, Pa., assignor to T. B. Wood's Sons Company, a corporation of Pennsylvania
Original application Mar. 7, 1961, Ser. No. 94,046, now Patent No. 3,108,483, dated Oct. 29, 1963. Divided and this application Mar. 25, 1963, Ser. No. 267,457
11 Claims. (Cl. 74—230.17)

This is a division of application Serial No. 94,046, filed March 7, 1961, for Variable Pitch Sheaves Having a Large Number of Grooves, now Patent No. 3,108,483.

This invention relates to multi-grooved variable pitch sheaves and particularly to sheaves having comparatively large numbers of flanges and grooves.

In the past it was known that in variable pitch sheaves having axially adjustable flanges provided with conical faces oppositely arranged in adjacent pairs facing each other, when the number of grooves was comparatively large, say more than four, it was desirable to provide means for locking all of the flanges directly onto a central sleeve serving as the hub of the sheave. Otherwise, in such sheaves, with only the end flanges locked, the inner flanges tended to move radially against the hub in operation causing wear and freezing on the hub.

In applicant's Patent No. 2,610,515 a construction is shown in which all of the flanges individually are locked on the hub sleeve due to the expansion of the hub sleeve. This construction tends to be impractical because it is complicated and expensive. To work satisfactorily the bores of the flanges must be very accurately maintained or they will not all lock up, and then fretting can occur.

An object of the present invention is to provide a construction for multi-grooved variable pitch sheaves in which the drawbacks mentioned above are eliminated.

Another object of the invention is to provide a construction of the type hereinabove mentioned, in which at least some of the interior flanges are maintained free and clear of the hub sleeve, and are held against lateral and axial displacement by especially securely fixed locking means located toward or at the ends of the sheave.

A further object of this invention is to provide a novel construction of end locking means for providing especially secure locking of the flanges toward the ends of the sheave.

A further object of this invention is to provide a construction in which the interior flanges of the sheave are sustained by the locking means, located at or toward the ends of the sheave, against radial movement into contact with the hub sleeve as well as against axial movement.

A further object of this invention is to provide a construction having the advantages set forth in the foregoing statement of objects while retaining the advantages of expeditious assembly of the system of flanges of the sheave.

Other objects of the invention will become apparent from the following detail description and representation of the invention in the drawings in which FIGURE 1 is a vertical sectional view of an assembly of a sheave according to a first embodiment of the invention;

FIGURE 2 is an end view of the embodiment of FIG. 1 looking toward the left;

FIGURE 3 is a vertical sectional view of the sheave assembly on the section line III—III of FIG. 1;

FIGURE 4 is a section approximately on the line IV—IV of FIG. 1, the hub being shown in elevation, illustrating details;

FIGURE 5 is a sectional view of a portion of the right hand end flange illustrating its axially extending inner flange as being axially split from its free end;

FIGURE 6 is a perspective view of a cross key serving as part of the adjusting mechanism;

FIGURES 7 and 8 are perspective views of cylindrical nuts serving as parts of the adjusting means.

According to the present invention represented by FIGS. 1-8, reference numeral 1 designates a sleeve which serves as the hub of the sheave, and upon which the other elements, such as the conical flanges, are mounted. Sleeve 1 is provided with a split 2 extending longitudinally from one end 4 for a substantial part of the length of the sleeve. This split is of appreciable width and serves to permit the sleeve to be contracted for mounting on a shaft (not shown) for operation. The inner diameter of the sleeve 1 at the end portion 3 opposite that from which split 2 extends is greater than the diameter of the other portion thereof. Approximately opposite the split 2 the inner face of the sleeve 1 is provided with a longitudinally extending kerf 5, which increases the flexibility of the sleeve to facilitate mounting of the sleeve on a shaft by contraction. As shown this kerf extends the entire length of the portion of the sleeve having the smaller internal diameter.

On the outside of sleeve 1 are mounted the elements of the sheave by which the V-shaped grooves are formed. As represented in the embodiment illustrated by FIGS. 1 to 8 there are two sets of flanges 6, 6', 6'', 6''' and 6'''', and 8, 8', 8'', 8''' and 8'''', each set being illustrated as comprising five flanges, each set being held together in a rigid group by bolts 9, and 10, respectively, and pipe spacers 11 which extend through openings in the flanges of the other set respectively. One of the sets 12 has conical surfaces 13 toward their radially outward portions facing to the left as viewed in FIG. 1, and the other set 14 has conical surfaces 15 facing oppositely, and since the flanges of the two sets are arranged alternately, the two sets form five pairs of groove-forming elements.

One of the principal purposes of the present invention is to mount and lock the flanges in such a way that most of the inner flanges of each set are carried by some of the flanges of the corresponding set located toward the ends and to this end the central portion of the outside of sleeve 1 is provided with a slightly reduced diameter 16 providing clearance 17 between the sleeve and the inner edges of all of the flanges of each set except the two toward each end of the sheave, even though the inner diameters of the flanges located along the reduced portion 18 are equal to the full outside diameter of the sleeve. In case the inside diameter of the inner flanges is made slightly larger than the full outside diameter of the sleeve the groove can be omitted but in such case the operation of assembling of the sheave is somewhat complicated for reasons which will be explained later.

In order to lock the flanges on the sleeve with sufficient firmness to resist the forces which develop in operation, the first end flange 20 and 21 at each end of the sheave is provided with an axially extending flange each extending in the direction of the respectively adjacent end of the sleeve, and the inside diameter of said first flanges and of their axial extensions is larger than the outside diameter of the sleeve. Each of the second-from-the-end-flanges 22 and 23 respectively, is provided with an axially extending flange 22' and 23' respectively at its inner edge extending toward the respectively adjacent end of the sleeve and of a thickness and size as to pass through and fill the opening inside the respectively adjacent first flanges 20 and 21. The axially extending flanges of both the said first and second-from-the-end flanges are at both ends of the sheave provided with one or more splits 24 and 25 from their free ends of sufficient width to permit contraction by locking collars 28 and 29 respectively, having cross-bolts 30, 31 which extend, respectively, through opening 32 and thread into screw threaded bores 34 on the opposite sides of gaps 37 therein.

The bolts 9 and 10 which hold the flanges in sets may be screw-threaded on both ends, and one of each is threaded in to a screw threaded bore 38, 39, in the opposite end flanges, respectively. The other ends are provided with nuts 41, 42 which engage against the axially outer faces of the respective second-from-end flanges. The two first flanges are each provided with openings which freely accommodate the nuts and bolt ends depending on the condition of adjustment of the variable pitch sheave.

The mechanism for effecting adjustment of the flanges for altering the pitch of the sheave is comprised of a pair of cylindrical nuts 44, 45. Nut 44 is lodged in radial, cylindrical bore 46, in the axial flange 23′ of the right hand first flange 6″″ of flange set 12 and the other in a similar bore 47 of the axial flange 21′ of right hand first flange 21 of flange set 14. The nuts 44 and 45 are disposed in axially spaced relationship, and have bores 50, 51, respectively, extending transversely of the nuts, and, thus, axially of the sheave in operative position, and the bores of the said nuts are provided with threads of opposite hand in their bores. Through these bores an adjusting screw 52 extends having on its corresponding portions threads matching those of the nuts. The outer end portion of screw 52 is of reduced diameter forming a shank 53 and a head 54 is attached thereto by a rollpin 55 extending laterally through the same and through a transverse bore in the shank of the adjusting screw. To accommodate the nuts 44 and 45 and the adjusting screw the adjacent end portion of sleeve 1 is appropriately recessed as indicated at 56.

At its extreme right hand end sleeve 1 is also provided with a transversely extending recess 57 at its outer edge, in which recess is seated a cross key 59 which is secured to the sleeve by screws 60. This cross key is provided with an opening 61, through which extends the shank 53 of adjusting screw 52. In assembled relation the cross key 59 is situated between the shoulder 62 at the inner end of shank 53 and head 54. Cross key 59 serves to anchor adjusting screw 52 against axial movement.

To effect adjustment of the pitch of the sheave the locking collars 28 and 29 are loosened and screw head 54 is turned. Since the nut 44 is connected with one set of flanges and nut 45 with the other set, the two sets of flanges will move relative to each other, until, in the extreme position of adjustment opposite to that shown, the nut 41 of bolt 9 will be located in opening 41′ of the right band end flange 8 and nut 42 of bolt 10 will be located in opening 42′ of left hand flange 6.

When the desired position of adjustment is obtained, the locking collars 28 and 29 are tightened by operating cross bolts 30 and 31 whereupon the said collars squeeze and contract the axial flanges 20′, 22′, and 21′, 23′ upon the sleeve and the split portion of the sleeve 1 upon the shaft upon which it is to be mounted, for example, the shaft of an electric motor.

Due to the fact that each of the locking collars 28 and 29 bears on two flange sleeves as well as on the hub sleeve, a firmer grip and more secure locking of the sheave is attained, and, therefore, a greater number of flanges and resulting grooves can be used than would be possible with a sheave in which only the axial flanges of the end flanges were squeezed against the sleeve.

The embodiment of the invention according to the present application has the advantage that the centers of operation of the grooves are not altered by adjustment of the pitch.

The advantage of forming the middle portion of the sleeves with slightly reduced diameter instead of providing slightly larger inner diameters in the intermediate flanges is that in assembling the sheaves the flanges can be threaded onto a dummy sleeve of a diameter equal to the full diameter of the sleeve on which they will be mounted for operation, and the task of inserting the various bolts and pipe spacers through their corresponding openings in the flanges is greatly simplified. If the sleeves are made of uniform diameter and the intermediate flanges with larger inner diameters the danger of the flanges bearing against the sleeve with consequent fretting wear and possible freezing can be avoided, but the work involved in assembling of the elements is more complicated and time consuming.

I claim:

1. In a multi-grooved, adjustable pitch sheave, a sleeve, a plurality of sheave flanges on said sleeve, said flanges having conical surfaces toward their outer edges, said flanges being arranged with said conical flanges alternately facing in opposite axial directions forming V-shaped grooves between the adjacent pairs thereof, means fixedly connecting the alternate ones of said flanges into sets, pitch adjusting means for moving one of said sets axially relative to the other set, releasable means fixedly securing the end sheave flanges of said one of said sets of flanges on said sleeve, the connecting means of said sets of flanges supporting the intermediate flanges of said sets, respectively, against both axial and radial movement in operation with said intermediate flanges out of contact with said sleeve and means fixing said other set on said sleeve.

2. A multi-grooved, adjustable pitch sheave according to claim 1, and in which each of the second from the end flanges of each set has an axially extending flange at its inner edge extending respectively toward its adjacent end of the sheave the end flanges of both sets of flanges each has an axially extending flange at its inner edge extending respectively toward the adjacent end of the said sleeve with the axial flanges of the second-from-end flanges located radially within the said axial flanges of the end flanges of the sheave, said axially extending flanges being split, said securing means comprising split locking collars encompassing said axially extending split flanges at the respective ends to squeeze both of said axially extending flanges at each end jointly to increase the locking effection the hub.

3. A multi-grooved, adjustable pitch sheave according to claim 2, and in which the axially extending flanges of the second-from-the-end flanges extend axially through at least part of the same axial extent as the axial flanges of the corresponding end flanges.

4. A multi-grooved, adjustable pitch sheave according to claim 2, and in which said sleeve is provided with a split of substantial width extending from one end thereof a substantial part of its length to allow compression of said sleeve by the locking collar adjacent said one end for locking said sleeve upon a shaft for operation.

5. A multi-grooved, adjustable pitch sheave according to claim 4, and in which said sleeve is provided with a groove in its inner surface extending axially thereof angularly spaced from the split therein for increasing the flexibility of said sleeve for mounting purposes.

6. A multi-grooved, adjustable pitch sheave according to claim 5, and in which said sleeve has a greater internal diameter toward its end opposite the end from which said split extends, the depth of said groove being approximately equal to the difference in internal radii of the sleeve at points on opposite sides of the two internal diameters of the sleeve.

7. A multi-grooved, adjustable pitch sheave according to claim 2, and in which said pitch adjusting means comprises a pair of nuts having axially extending axes located in recesses formed, respectively, in the axially extending flanges of the end flange and second-from-end flange at one end of the sheave, said nuts having threads of opposite hand, an adjusting screw having two sets of axially spaced threads of opposite hand engaging the corresponding threads of said nuts, means fixing said screw relative to said sleeve, and accessible means for turning said screw to move both of said sets of flanges relative to said sleeve to adjust the pitch of the sheave without moving the centers of the V-shaped grooves.

8. A multi-grooved, adjustable pitch sheave according to claim 7, and in which the means fixing said adjusting screw relative to said sleeve comprises a shoulder formed on said screw, a cross key secured to said sleeve and abutting said shoulder, and having an opening through which said screw extends.

9. A multi-grooved, adjustable pitch sheave according to claim 8, and in which the means for turning said screw comprises a part of the screw extending outwardly of said cross key.

10. A multi-grooved, adjustable pitch sheave according to claim 7, and in which said sleeve is provided with an axially extending groove at one end of the outer periphery of said sleeve for accommodating at least in part said axial nuts and said adjusting screw.

11. A multi-grooved, adjustable pitch sheave according to claim 8, and in which the outer periphery of the end of said sleeve adjacent said adjusting means is provided with a transversely extending recess accommodating said cross key.

References Cited by the Examiner
UNITED STATES PATENTS

| | | |
|---|---|---|
| 2,151,987 | 3/39 | Perrine et al. |
| 2,907,597 | 10/59 | Williams. |

FOREIGN PATENTS

| | | |
|---|---|---|
| 462,039 | 19/37 | Great Britain. |
| 66,398 | 2/52 | Great Britain. |

DON A. WAITE, *Primary Examiner.*